United States Patent
Huang et al.

(10) Patent No.: US 8,607,084 B2
(45) Date of Patent: Dec. 10, 2013

(54) COMPUTER SYSTEM AND METHOD FOR SAVING POWER CONSUMPTION BY PLACING A SECOND COMPUTER PORTION INTO A SLEEP MODE AFTER COMPLETED TRANSFERING IMAGE DATA TO A FIRST COMPUTER PORTION

(75) Inventors: Chung-Ching Huang, New Taipei (TW); Kuo-Han Chang, New Taipei (TW); Chih-Nan Lo, New Taipei (TW); Donna Lim, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 231 days.

(21) Appl. No.: 13/115,792

(22) Filed: May 25, 2011

(65) Prior Publication Data

US 2011/0307720 A1 Dec. 15, 2011

Related U.S. Application Data

(60) Provisional application No. 61/353,768, filed on Jun. 11, 2010.

(30) Foreign Application Priority Data

Oct. 8, 2010 (TW) ................................ 99134459 A

(51) Int. Cl.
*G06F 1/26* (2006.01)
*G06F 1/00* (2006.01)

(52) U.S. Cl.
USPC ............................ 713/320; 713/323; 713/324

(58) Field of Classification Search
USPC ......................................... 713/320, 324, 340
See application file for complete search history.

(56) References Cited

U.S. PATENT DOCUMENTS

| | | | | |
|---|---|---|---|---|
| 6,212,599 | B1* | 4/2001 | Baweja et al. | 711/106 |
| 7,177,528 | B1* | 2/2007 | Yada et al. | 386/222 |
| 8,046,617 | B2* | 10/2011 | Fleck et al. | 713/324 |
| 2003/0187654 | A1* | 10/2003 | Hoshino | 704/270 |
| 2005/0078562 | A1* | 4/2005 | Morimoto et al. | 369/2 |
| 2005/0235167 | A1* | 10/2005 | Tiotantra et al. | 713/300 |
| 2006/0051065 | A1 | 3/2006 | Feng | |
| 2006/0092278 | A1* | 5/2006 | Kondo et al. | 348/152 |
| 2006/0095801 | A1* | 5/2006 | Penning et al. | 713/320 |
| 2007/0220202 | A1* | 9/2007 | Sutardja et al. | 711/113 |
| 2007/0291858 | A1* | 12/2007 | Hussain et al. | 375/240.29 |

FOREIGN PATENT DOCUMENTS

| | | |
|---|---|---|
| CN | 1530953 A | 9/2004 |
| CN | 2697720 Y | 5/2005 |

* cited by examiner

*Primary Examiner* — Thomas Lee
*Assistant Examiner* — Phil Nguyen
(74) *Attorney, Agent, or Firm* — Kirton McConkie; Evan R. Witt

(57) ABSTRACT

A computer system and a power-management method thereof are provided. The computer system has an image-reading mode, a first power-management mode and a second power-management mode, and the computer system operating in the second power-management mode consumes less power than it consumes in the first power-management mode. The computer system comprises a first portion comprising a graphics processing unit, a memory space and a display; and a second portion comprising a storage storing an image data. When the computer system operates in the image-reading mode, the image data has been transferred to the memory space from the storage, the second portion enters to the second power-management mode from the first power-management mode, and the first portion keeps in the first power-management mode, so that the graphics processing unit can display an image by the display according to the image data stored in the memory space.

11 Claims, 3 Drawing Sheets

COMPUTER SYSTEM AND METHOD FOR SAVING POWER CONSUMPTION BY PLACING A SECOND COMPUTER PORTION INTO A SLEEP MODE AFTER COMPLETED TRANSFERING IMAGE DATA TO A FIRST COMPUTER PORTION

CROSS REFERENCE TO RELATED PATENT APPLICATION

This patent application is based on a U.S. provisional patent application No. 61/353,768 filed Jun. 11, 2010.

FIELD OF THE INVENTION

The present invention relates to the field of computer system, and more particularly to a computer system which can consume less power when it is displaying images and a power management method thereof.

BACKGROUND OF THE INVENTION

With the development of science and technology, people have gradually employed an electrophoresis display (EPD) or a portable computer system which is installed with a reading software to read E-books. Thus, people can carry various books more conveniently, and the problem of wasting paper can also be avoided.

However, when the portable computer system displays the contents of the E-books, the whole system operates in the power management mode S0 (i.e., in the normal operation), so that the computer system consumes most power. The so-called power management mode S0 is a power management standard defined in the Advanced Configuration and Power Interface (ACPI) protocol.

From the above description, it can be seen that the portable computer system must be charged after a user reads the E-books for several hours. And this is inconvenient in use.

SUMMARY OF THE INVENTION

The present invention is to provide a computer system, and the computer system can save power when it is displaying images.

The present invention is to provide a power-management method, which is adapted to the above computer system.

The present invention provides a computer system. The computer system has an image-reading mode, a first power-management mode and a second power-management mode, and the computer system operating in the second power-management mode consumes less power than it consumes in the first power-management mode. The computer system comprises a first portion comprising a graphics processing unit, a memory space and a display; and a second portion comprising a storage storing an image data. When the computer system operates in the image-reading mode, the image data has been transferred to the memory space from the storage, the second portion enters to the second power-management mode from the first power-management mode, and the first portion keeps in the first power-management mode, so that the graphics processing unit can display an image by the display according to the image data stored in the memory space.

The present invention also provides a power-management method adapted to a computer system. The computer system has an image-reading mode, a first power-management mode and a second power-management mode, and the computer system operating in the second power-management mode consumes less power than it consumes in the first power-management mode. The computer system comprises a first portion and a second portion. The first portion comprises a graphics processing unit, a memory space and a display. The second portion comprises a storage storing an image data. The power-management method comprises the following steps: performing a transferring operation, so as to transfer the image data of the storage to the memory space; controlling the second portion to enter to the second power-management mode from the first power-management mode, and controlling the first portion to keep in the first power-management mode after performing the transferring operation; and enabling the graphics processing unit to display an image by the display according to the image data stored in the memory space.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
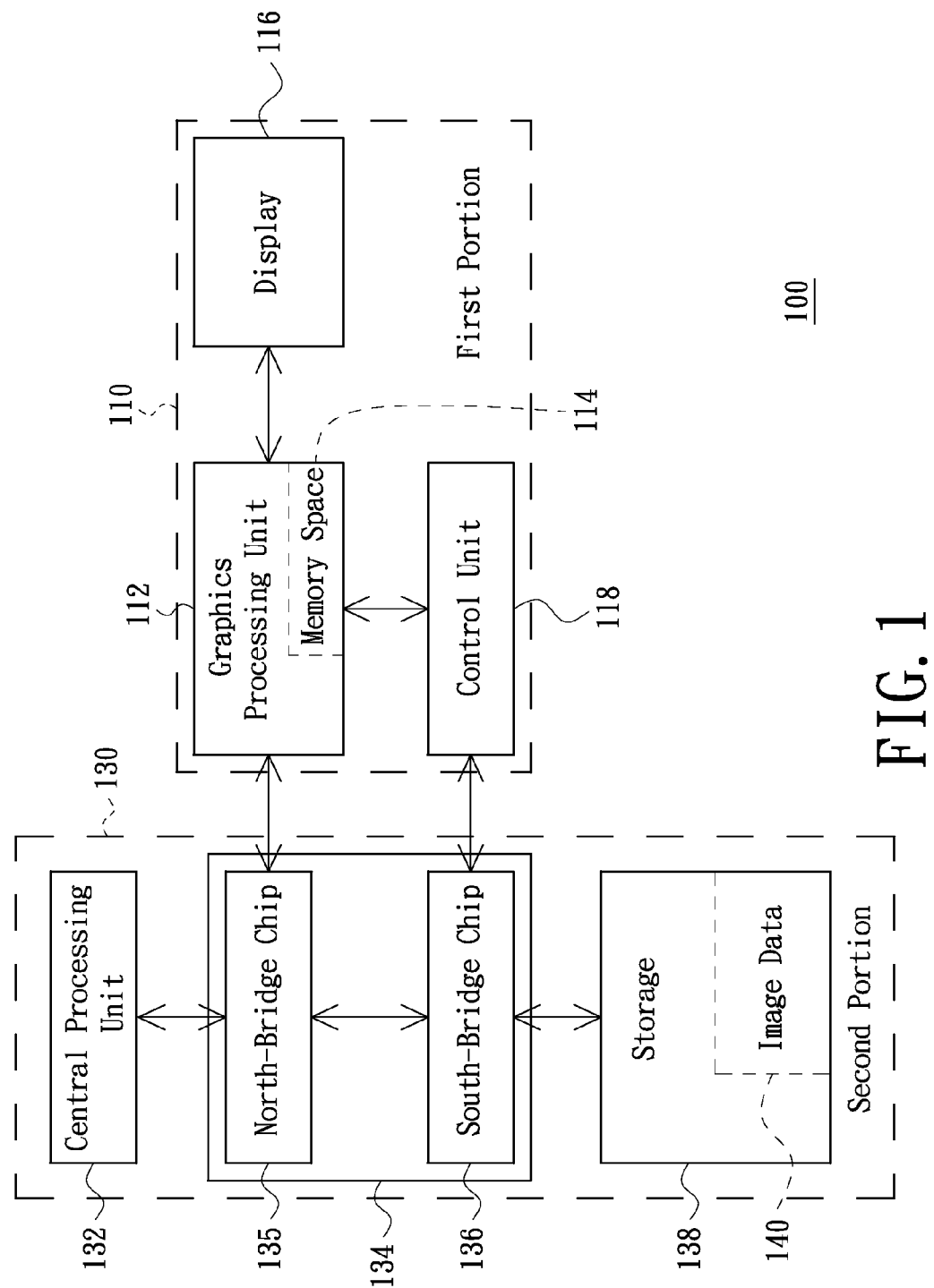
FIG. 1 is a block schematic view of a computer system in accordance with an embodiment of the present invention.

FIG. 1 is a block schematic view of a computer system in accordance with an embodiment of the present invention. Referring to FIG. 1, the computer system 100 has an image-reading mode, a first power-management mode and a second power-management mode. The computer system 100 may be a portable computer system, and the computer system 100 operating in the second power-management mode consumes less power than it consumes in the first power-management mode. The first power-management mode may be regarded as an operation state such as the power-management mode S0 (i.e., the S0 mode). The second power-management mode may be regarded as a saving-power state such as the power-management mode S3 (i.e., the S3 mode). In addition, the power-management modes mentioned in this specification are power-management standards defined in the Advanced Configuration and Power Interface (ACPI) protocol. It should be noted that when the computer system mentioned in the embodiments of the present invention operates in the image-reading mode, the elements in relation to the image-displaying operation of the computer system are in the first power-management mode (i.e., in the operation state), and the other elements of the computer system are in the second power-management mode (i.e., in the saving-power state). This will be described in detail as follows.

The computer system 100 comprises a first portion 110 and a second portion 130. The first portion 110 comprises the elements which must be used when the computer system 100 is displaying images, and the first portion 110 comprises a graphics processing unit 112, a display 116 and a control unit 118. The graphics processing unit 112 is electrically coupled to the display 116 and the control unit 118. In this embodiment, the graphics processing unit 112 has a memory space 114 configured for storing the image data which is desired to be displayed. It should be noted that the control unit 118 is powered continuously, and it means the power state of the control unit 118 does not affected by the power-management modes. That is, the control unit 118 continuously in the first power-management mode. In an embodiment, the control unit 118 may be an embedded controller (EC). In addition, when the computer system enters the image-reading mode, the elements of the first portion 110 are powered continuously (i.e., operate in the first power-management mode), so that they can continuously be operated. In fact, the elements of the first portion 110 will be electrically coupled to the same power plane. In addition, the first portion 110 is also configured for displaying images in the first power-management mode.

The second portion 130 comprises a central processing unit (CPU) 132, a chipset 134 and a storage 138. In this exemplary embodiment, the chipset 134 is composed of a north-bridge chip 135 and a south-bridge chip 136. In other embodiments, the chipset 134 may be a single chip integrating with the functions of the north-bridge chip and the south-bridge chip. As shown in FIG. 1, the north-bridge chip 135 is electrically coupled to the central processing unit 132 and the graphics processing unit 112, and the south-bridge chip 136 is electrically coupled to the north-bridge chip 135, the control unit 118 and the storage 138. In the exemplary embodiment, the storage 138 may be a non-volatile memory, and it has a memory space configured for storing image data 140. The image data 140 may be the image data of E-books or photos. It should be noted that the power state of the second portion 130 changes with the power-management modes. Therefore, when the computer system 100 enters the image-reading mode, the second portion 130 changes to the second power-management mode from the first power-management mode (i.e., from the operation state to the power-saving state). Since the first portion 110 and the second portion 130 of the computer system 100 operate in different power-management modes under the image-reading mode, the elements of the first portion 110 and the elements of the second portion 130 are electrically coupled to different power planes.

It should be noted that the image data which is desired to be displayed and stored in the memory space 114 is accessed by a transferring operation. This will be described in following. Generally, the image data 140 which is desired to be displayed may be firstly stored in the storage 138. When the computer system 100 is going to enter the image-reading mode so a user can read the data displayed thereon, the computer system 100 may firstly transfer the image data 140 stored in the storage 138 to the memory space 114 of the graphics processing unit 138 under the first power-management mode. After the transferring operation, the second portion 130 of the computer system 100 enters to the second power-management mode from the first power-management mode, and the first portion 110 still keeps in the first power-management mode, so that the graphics processing unit 112 can display the images by the display 116 according to the image data stored in the memory space 114. Therefore, the computer system 100 can save power when it is displaying images. In addition, although the above description describes that the computer system 100 enters the image-reading mode after the transferring operation has been completed, the operation of the computer system of the present invention is not limited herein. In fact, the computer system of the present invention can also perform the transferring operation early under the normal-using state and continuously supply the power to the memory space 114, and then because the image data has been transferred to the memory space 114 from the storage 138, the computer system directly enters the image-reading mode without the above transferring operation when a user needs to read the image data. When the user needs to read the image data, he or she can press a button or make a choice on the display to trigger this image-reading mode.

From the above description, it can be seen that the computer system 100 of this invention can operate in different power states. In an embodiment, the whole computer system 100 is in the first power-management mode such as an operation state. In another embodiment, the whole computer system 100 is in the second power-management mode such as a power-saving state. In still another embodiment, when the computer system 100 enters the image-reading mode, the first portion 110 of the computer system 100 keeps in the first power-management mode, and the second portion 130 of the computer system 100 keeps in the second power-management mode.

In addition, the control unit 118 of the computer system 100 is configured for transmitting a control command to the graphics processing unit 112, so that the graphics processing unit 112 can perform a corresponding operation for the image displayed by the display 116. The so-called corresponding operation may comprise rolling the image displayed by the display 116 or replacing the image displayed by the display 116. For example, the control command can control the graphic processing unit 112 to replace the current image by a next image (i.e., performs a next-page function) or replace the current image by a previous image (i.e., performs a previous-page function). It should be noted that the control unit 118 may be electrically coupled to the graphics processing unit 112 through an inter-integrated circuit (I2C) serial bus (not shown) or at least one general purpose input/output (GPIO) pin (not shown), to transmit the control command. In another embodiment, the control unit 118 is further configured for altering the operation mode of the computer system 100, so that a user can trigger the computer system 100 through the control unit 110 to enable the computer system 100 to enter to the image-reading mode from a normal-using state.

In addition, a print driver may be installed in the computer system 100 to convert a file which is desired to be printed into image data, and the corresponding print step is performed under the first power-management mode. In another embodiment, the print driver is an inbox driver. Therefore, if the computer system 100 cannot perform the reading operation on some files with some formats, the computer system 100 still can perform a printing function on these files by the print driver to convert the contents of the these files into image data. Thus, the user still can read these files by the computer system 100 after a transferring operation for the image data has been completed, wherein this transferring operation may be performed in the normal-using state or after the user triggers the image-reading mode.

Figure 2:
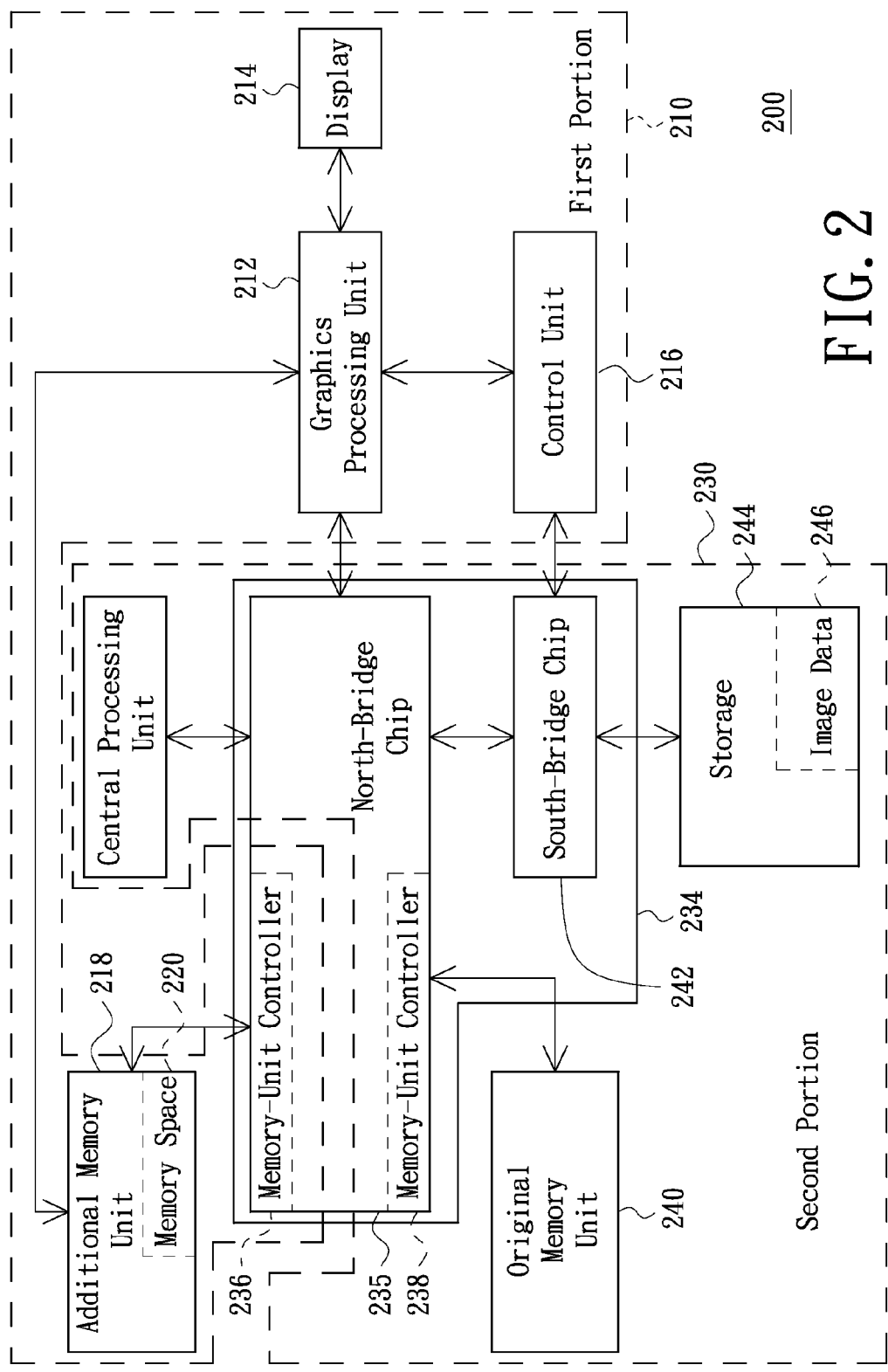
FIG. 2 is a block schematic view of a computer system in accordance with another embodiment of the present invention.

FIG. 2 is a block schematic view of a computer system in accordance with another embodiment of the present invention. Referring to FIG. 2, the computer system 200 also has an image-reading mode, a first power-management mode and a second power-management mode. The computer system 200 may be a portable computer system, and the computer system 200 operating in the second power-management mode consumes less power than it consumes in the first power-management mode. The first power-management mode, the second power-management mode and the image-reading mode are the same with those of the above embodiment, and this will not be further described here.

The computer system 200 is similar to the computer system 100 except that the computer system 200 comprises an additional memory unit 218 and an original memory unit 240. The original memory unit 240 means this memory unit generally is configured in the computer system, while the additional memory unit 218 means this memory unit is configured for the image-reading mode of the present invention. The memory units 218 and 240 may be dynamic random access memories (DRAMs). The memory space 220 of the additional memory unit 218 will perform the same function as the memory space 114 of the computer system 100 does (this will be described later). In addition, the chipset 234 of the computer system 200 also comprises two memory-unit controllers configured for controlling the memory units 218 and 240 respectively, and the two memory-unit controllers are labeled by 236 and 238 respectively.

In this embodiment, the computer system 200 is also divided into two portions. A first portion 210 comprises the elements which must be used when the computer system 200 is displaying images, and the first portion 210 comprises a graphics processing unit 212, a display 214, a control unit 216, an additional memory unit 218 and a first portion of the chipset 234 (not labeled). The first portion of the chipset 234 comprises a memory-unit controller 236 electrically coupled to the additional memory unit 218. As described in the above embodiment, when the computer system 200 enters the image-reading mode, the elements of the first portion 210 are in a continuously power-supplying state, so they can continuously be operated. In fact, the elements of the first portion 210 will be electrically coupled to the same power plane. In addition, the second portion 230 of the computer system 200 comprises a central processing unit 232 (CPU), a second portion of the chipset 234 (not labeled), an original memory unit 240 and a storage 244. The second portion of the chipset 234 comprises a memory-unit controller 238 electrically coupled to the memory unit 240. In this embodiment, the chipset 234 is composed of a north-bridge chip 235 and a south-bridge chip 242, and the memory-unit controllers 236 and 238 are both disposed in the north-bridge chip 235. In other embodiments, the chipset 234 may also be a single chip integrating with functions of the north-bridge chip and the south-bridge chip. As the operation described in the above embodiment, when the computer system 200 enters the image-reading mode, the second portion 230 of the computer system 200 changes to the second power-management mode from the first power-management mode (i.e., from the operation state to the power-saving state). Since the first portion 210 and the second portion 230 of the computer system 200 operate in the different power-management modes under the image-reading mode, the elements of the first portion 210 and the elements of the second portion 230 will be electrically coupled to different power planes respectively. The coupling relations of these elements are shown in FIG. 2, and this will not be further described here. In addition, the storage 244 may be a non-volatile memory, and it has a memory space for storing image data 246. The image data 246 may be the image data of E-books or photos.

It should be noted that the image data which is desired to be displayed and stored in the memory space 220 may be accessed by a transferring operation. This will be described in following. Generally, the image data which is desired to be displayed may be firstly stored or located in the storage 244. When the computer system 200 is going to enter the image-reading mode so a user can read the data displayed thereon, the computer system 200 may firstly transfer the image data 246 of the storage 244 to the memory space 220 of the additional memory unit 218 under the first power-management mode. After the transferring operation, the second portion 230 of the computer system 200 enters to the second power-management mode from the first power-management mode, and the first portion 210 keeps in the first power-management mode, so that the graphics processing unit 212 can display the images by the display 214 according to the image data stored in the memory space 220. Therefore, the computer system 200 can save power when it is displaying images. In another embodiment, this transferring operation may be performed in the normal-using state before the user triggers the image-reading mode.

In addition, the control unit 216 of the computer system 200 is configured for transmitting a control command to the graphics processing unit 212, so that the graphics processing unit 212 can perform a corresponding operation on the image displayed by the display 214. The so-called corresponding operation may comprise rolling the image displayed by the display 116 or replacing the image displayed by the display 116, which is the same with the corresponding operation mentioned above. In addition, the control unit 216 may be electrically coupled to the graphics processing unit 212 through an inter-integrated circuit (I2C) serial bus (not shown) or at least one general purpose input/output (GPIO) pin (not shown) to transmit the control command. In addition, a print driver may further be installed in the computer 200 to convert a file which is desired to be printed into image data, it just the same with the operation described above. In another embodiment, the control unit 216 is further configured for altering the operation mode of the computer system 200, so that a user can trigger the computer system 200 through the control unit 216 to enable the computer system 200 to enter to the image-reading mode from the normal-using state.

From the above description, it can be seen that the computer system 200 of this invention can operate in different power states by the control unit 118, 216. In an embodiment, the whole computer system 200 is in the first power-management mode such as an operation state. In another embodiment, the whole computer system 200 is in the second power-management mode such as a power-saving state. In still another embodiment, when the computer system 200 enters the image-reading mode, the first portion 210 of the computer system 200 keeps in the first power-management mode, and the second portion 230 of the computer system 200 enters to the second power-management mode.

Figure 3:
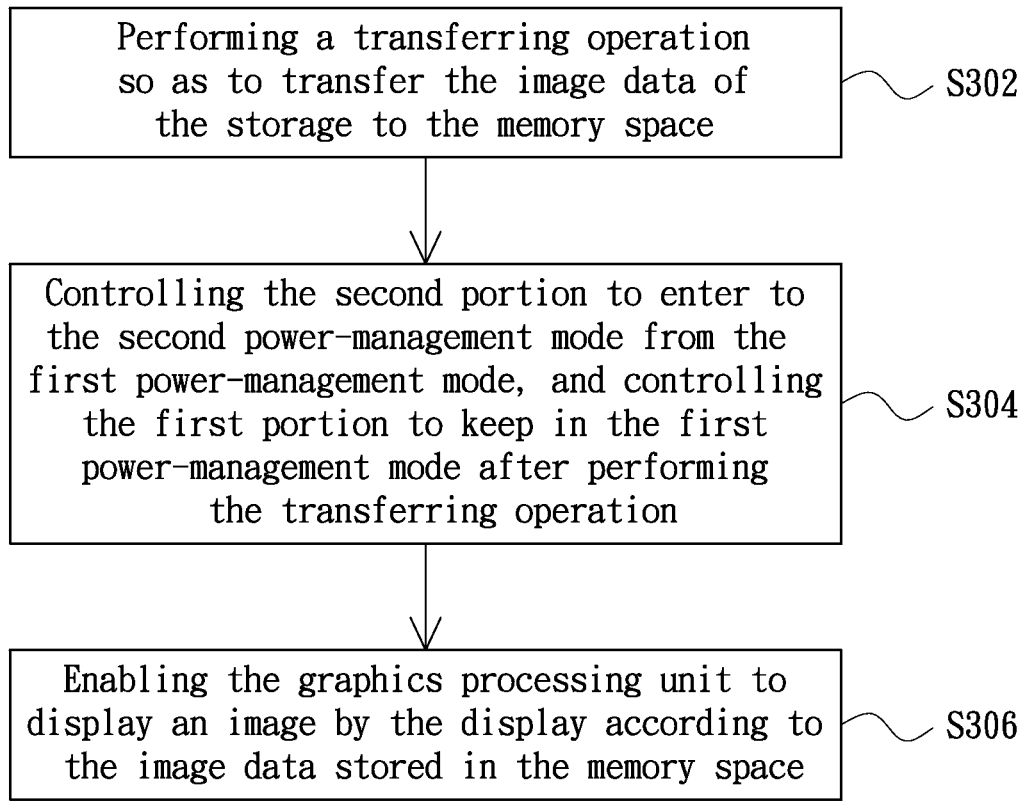
FIG. 3 is a flow chart of a power-management method in accordance with an embodiment of the present invention.

From the above embodiments, people skilled in the art can conclude some basic operation steps of the present invention as shown in FIG. 3. FIG. 3 is a flow chart of a power-management method in accordance with an embodiment of the present invention. The power-management method is adapted to a computer system. The computer system has an image-reading mode, a first power-management mode and a second power-management mode, and the computer system operating in the second power-management mode consumes less power than it consumes in the first power-management mode. The first power-management mode, the second power-management mode and the image-reading mode are the same with those of the above embodiments, and this will not be further described here. In addition, the computer system comprises a first portion and a second portion. The first portion comprises a graphics processing unit, a memory space and a display, and the second portion comprises a storage storing image data. The method comprises the following steps: performing a transferring operation, so as to transfer the image data of the storage to the memory space (as shown in step S302); controlling the second portion to enter to the second power-management mode from the first power-management mode, and controlling the first portion to keep in the first power-management mode after performing the transferring operation (as shown in step S304); and enabling the graphics processing unit to display an image by the display according to the image data stored in the memory space (as shown in step S306).

In summary, the present invention divides the computer system into a first portion and a second portion to solve the above problem. The first portion comprises elements which must be used when the computer system is displaying images, and the first portion comprises a graphic processing unit and a display. The second portion comprises a central processing unit, a chipset and a storage storing an image data. Thus, when the computer system enters the image-reading mode, the image data of the storage is firstly transferred to the memory space of the graphics processing unit. After the transferring operation, the second portion (which is not in relation to the image-displaying operation) enters to the second power-management mode from the first power-management mode to consume less power, and the first portion (which is in relation to the image-displaying operation) keeps in the first power-management mode, so that the graphics processing unit can display the image by the display according to the image data stored in the memory space. Therefore, the computer system can save power when it is displaying images.

Another embodiment of the present invention is adding an additional memory unit to the computer system, employing a chipset having two memory-unit controllers, and dividing the computer system into a first portion and a second portion. The first portion comprises the elements which must be used when the computer system is displaying images, and the first portion comprises a graphics processing unit, a display, the additional memory unit and the first portion of the chipset. The first portion of the chipset comprises one of the memory-unit controllers, and the said memory-unit controller is electrically coupled to the additional memory unit. The second portion comprises a central processing unit, a storage storing the image data, an original memory unit and the second portion of the chipset. The second portion of the chipset comprises the other memory-unit controller electrically coupled to the original memory unit. When the computer system enters the image-reading mode, it may firstly transfer the image data of the storage to the memory space of the additional memory unit. After the transferring operation, the second portion (which is not in relation to the image-displaying operation) enters to the second power-management mode from the first power-management mode to consume less power, and the first portion (which is in relation to the image-displaying operation) keeps in the first power-management mode, so that the graphics processing unit can display images by the display according to the image data stored in the memory space. Therefore, the computer system can save power when it is displaying images.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system, having a first power-management mode and a second power-management mode, wherein the computer system operating in the second power-management mode consumes less power than it consumes in the first power-management mode, the computer system comprises:
    a first portion, comprising one graphics processing unit, a display, a first memory unit, and a first memory-unit controller in a chipset, wherein the display and the first memory unit are electrically coupled to the graphics processing unit, and the first memory-unit controller is electrically coupled to the first memory unit; and
    a second portion, comprising one central processing unit, a storage storing an image data, a second memory unit, and a second memory-unit controller in the chipset, wherein the central processing unit, the storage and the second memory unit are electrically coupled to the chipset, and the second memory-unit controller is electrically coupled to the second memory unit;
    wherein, when in the first power-management mode, if the image data is desired to be displayed, the computer system transfers the image data to the first memory unit of the first portion from the storage of the second portion under the first power-management mode and wherein, when in the first power-management mode, the graphic processing unit displays images by accessing the image data in the first memory unit and outputting the images to the display;
    wherein, when the computer system desires to operate in an image-reading mode for image data displaying while conserving power and the image data has been transferred to the first memory unit of the first portion from the storage, the second portion enters to the second power-management mode from the first power-management mode, and the first portion continues keeping in the first power-management mode, so that the graphics processing unit displays an image by the display according to the image data stored in the first memory unit, and thereby the first memory-unit controller and the second memory-unit controller in the chipset operate in different power-management modes and the graphics processing unit displays images from image data stored in the first memory unit in both the first and the second power-management modes; and
    wherein the computer system installs a print driver configured for converting a file which will be printed into the image data.

2. The computer system according to claim 1, wherein the first portion and the second portion are electrically coupled to different power planes respectively.

3. The computer system according to claim 1, wherein the first portion further comprises:
    a control unit, electrically coupled to the graphics processing unit and configured for transferring a control command to the graphics processing unit, so that the graphics processing unit performs a corresponding operation on the image displayed by the display.

4. The computer system according to claim 3, wherein the corresponding operation comprises rolling the image or replacing the image.

5. The computer system according to claim 3, wherein the control unit is electrically coupled to the graphics processing unit through an inter-integrated circuit serial bus or at least one general purpose input/output pin.

6. The computer system according to claim 3, wherein the control unit is an embedded controller.

7. The computer system according to claim 3, wherein the control unit is further configured for altering the operation mode of the computer system, so that a user can trigger the computer system through the control unit to enable the computer system to enter to the image-reading mode from a normal-using state.

8. The computer system according to claim 1, wherein the chipset is composed of a north-bridge chip and a south-bridge chip, or the chipset is a single chip comprising functions of the north-bridge chip and the south-bridge chip.

9. The computer system according to claim 1, wherein the image data comprises the image data of an E-book or a photo.

10. A power-management method adapted to a computer system with only one graphics processing unit and only one central processing unit, the computer system having a first power-management mode and a second power-management mode, wherein the computer system operating in the second power-management mode consumes less power than it consumes in the first power-management mode, and the computer system comprises a first portion and a second portion, the first portion comprises the graphics processing unit, a display, a first memory unit, and a first memory-unit controller in a chipset, the display and the first memory unit being electrically coupled to the graphics processing unit, and the first memory-unit controller being electrically coupled to the first memory unit, and the second portion comprises the central processing unit, a storage for storing an image data, a second memory unit, and a second memory-unit controller in the chipset, the central processing unit, the storage and the second memory unit being electrically coupled to the chipset, and the second memory-unit controller being electrically coupled to the second memory unit, the graphics processing unit configured to display images from image data stored in the first memory unit when the computer system is operating in the first and the second power-management modes, the power-management method comprises:

performing a transferring operation by the computer system under the first power-management mode, so as to transfer the image data of the storage to the first memory unit of the first portion;

while in the first power-management mode, enabling the graphics processing unit to display an image by the display according to the image data stored in the first memory unit;

controlling the second portion to enter to the second power-management mode from the first power-management mode and controlling the first portion to keep in the first power-management mode, after performing the transferring operation;

enabling the graphics processing unit to display an image by the display according to the image data stored in the first memory unit, and thereby the first memory-unit controller and the second memory-unit controller in the chipset operate in different power-management modes and such that the graphics processing unit displays images by the display according to image data stored in the first memory unit in both the first and the second power-management modes; and installing a print driver configured for converting a file which will be printed into the image data.

11. A computer system, having a first power-management mode and a second power-management mode, wherein the computer system operating in the second power-management mode consumes less power than it consumes in the first power-management mode, the computer system comprises:

a first portion, comprising one graphics processing unit, a display, a first memory unit, and a first memory-unit controller in a chipset, wherein the display and the first memory unit are electrically coupled to the graphics processing unit, and the first memory-unit controller is electrically coupled to the first memory unit; and a second portion, comprising one central processing unit, a storage storing image data, a second memory unit, and a second memory-unit controller in the chipset, wherein the central processing unit, the storage and the second memory unit are electrically coupled to the chipset, and the second memory-unit controller is electrically coupled to the second memory unit;

wherein, in the first power-management mode, the first and second portions are fully powered to thereby enable the central processing unit to transfer image data from the storage to the first memory unit and to enable the graphics processing unit to generate displayable images from the image data in the first memory unit for output to the display; and wherein, in the second power-management mode, the first portion is fully powered while the second portion is powered at a reduced level to conserve power such that the graphics processing unit is enabled, in the second power-management mode, to continue generating displayable images from image data in the first memory unit for output to the display even though the second portion is powered at a reduced level wherein the computer system installs a print driver configured for converting a file which will be printed into the image data.

* * * * *